United States Patent [19]

Lin

[11] Patent Number: 5,047,931
[45] Date of Patent: Sep. 10, 1991

[54] PARALLEL COMPUTATION OF FAN-BEAM BACK-PROJECTION RECONSTRUCTION ALGORITHM IN COMPUTED TOMOGRAPHY

[75] Inventor: Wen-Tai Lin, Schenectady, N.Y.

[73] Assignee: General Electric Company, Schenectady, N.Y.

[21] Appl. No.: 358,300

[22] Filed: May 30, 1989

[51] Int. Cl.$^5$ ............................................. G06F 15/42
[52] U.S. Cl. .......................... 364/413.21; 364/413.17; 364/413.18
[58] Field of Search ...................... 364/413.21, 413.13, 364/413.14, 413.19, 413.17, 413.18

[56] References Cited

U.S. PATENT DOCUMENTS

| | | | |
|---|---|---|---|
| 4,482,958 | 11/1984 | Nakayama et al. | 364/413.21 |
| 4,549,265 | 10/1985 | Deckers et al. | 364/413.16 |
| 4,549,265 | 10/1985 | Deckers et al. | 364/413.21 |
| 4,680,709 | 7/1987 | Srinivasan et al. | 364/413.21 |
| 4,682,290 | 7/1987 | Tan et al. | 364/413.18 |
| 4,739,481 | 4/1988 | Yoshitome | 364/413.19 |
| 4,786,820 | 11/1988 | Ogino et al. | 358/213.22 X |
| 4,894,775 | 1/1990 | Kritchman et al. | 364/413.16 |
| 4,941,094 | 7/1990 | Satta et al. | 364/413.21 |
| 4,955,024 | 9/1990 | Pfeiffer et al. | 371/40.1 |

OTHER PUBLICATIONS

Herman et al., "Convolution Reconstruction Techniques for Divergent Beams", *Biologic Medicine*, vol. 6, Oct. 1976, pp. 259-271.

Gilbert et al., "Rapid Execution of Fan Beam Image Reconstruction Algorithms Using Efficient Computational Techniques . . .", *IEEE Trans. on Biomedical Eng.*, Feb 1981 pp. 98-115.

*Primary Examiner*—Jerry Smith
*Assistant Examiner*—Allen M. Lo
*Attorney, Agent, or Firm*—Allen L. Limberg; James C. Davis, Jr.; Marvin Snyder

[57] ABSTRACT

Parallel accumulation of the density functions of image picture elements is done for a number of elements located at the same radial distance from the axis of rotation for the fan-beam scanner. This allows the computation of weighting factor to be done in common for these elements, as well as the computation of interpolation coefficients for ray sums not registering exactly with x-ray detectors.

16 Claims, 7 Drawing Sheets

FIG. 5

| D(v,p) | 0,122 | 123,245 | 246,368 | 369,491 | 492,614 | 615,737 | 738,860 | 861,983 |
|---|---|---|---|---|---|---|---|---|
|  | PE1' | PE2' | PE3' | PE4' | PE5' | PE6' | PE7' | PE8' |
| T1 | P1 | P6 | P3 | P8 | P5 | P2 | P7 | P4 |
| T2 | P6 | P1 | P8 | P3 | P2 | P5 | P4 | P7 |
| T3 | P7 | P8 | P1 | P2 | P3 | P4 | P5 | P6 |
| T4 | P8 | P7 | P2 | P1 | P4 | P3 | P6 | P5 |
| T5 | P5 | P2 | P7 | P4 | P1 | P6 | P3 | P8 |
| T6 | P2 | P5 | P4 | P7 | P6 | P1 | P8 | P3 |
| T7 | P3 | P4 | P5 | P6 | P7 | P8 | P1 | P2 |
| T8 | P4 | P3 | P6 | P5 | P8 | P7 | P2 | P1 |

PARALLEL COMPUTATION OF FAN-BEAM BACK-PROJECTION RECONSTRUCTION ALGORITHM IN COMPUTED TOMOGRAPHY

The invention concerns computer architecture for computed tomography (CT) using a fan-beam energy source and, more particularly, a processor array adapted for computing the back-projection reconstruction algorithm.

BACKGROUND OF THE INVENTION

A large amount of data is generated in connection with three-dimensional CT scans of medical patients, which in the past has been stored in a mass storage medium and later called up for computed tomographic processing in extended time. This causes a substantial delay in a radiologist being able to view a reconstructed image, and often the medical patient has left the hospital before his reconstructed image can be viewed by the radiologist. It is highly desirable to shorten the time for computed tomographic processing, to avoid the backlog and thus facilitate the reconstructed images being viewed while the patient is still in the hospital. A shortened time for viewing the reconstructed images that allows the radiologist's review to be conducted straightaway permits unuseful images to be discarded. Only the useful images need then be retained and the data therein compressed for storage in the image archiving system. This can reduce the load on the image archiving system, which is much desired. Accordingly, a high performance system architecture is demanded, which has a certain degree of reconfigurability for various types of post-processing (e.g., image enhancement and image compression for archival storage).

In industrial computed tomography, such as used for inspection of parts, increased speed of analysis is also of substantial advantage. In these systems the relative rotation of the fan-beam scanner around the object of which a tomographic image is being made is usually provided by rotating the scanner around the object being x-rayed, but alternatively may be accomplished by rotating the object within the fan beam of a fixed-position scanner.

Although the Fourier inversion approach to computed tomography has inherent speed advantage over back-projection reconstruction, it is considered to be unsuitable for use with the fan beam scanner because of excessive sensitivity to noise. The convolution and back-projection reconstruction method is suitable for view pipelining and yields images that are relatively free of undesirable artifacts from processing. The back-projection reconstruction portion of the CT scan signal processing is the bulk of the data processing done on the signal and, as will be described in greater detail later in the specification in connection with FIG. 3 of the drawing, takes the longest computation time in prior-art CT scan signal processing.

Prior-art CT scan signal processing has invariably been carried forward using serial data processing. Data processing, which is done parallelly in time is generally known to be faster than serial data processing, and an object of the invention is to speed up back-projection reconstruction calculations through the use of parallel data processing. The problem is how to implement parallel data processing for back-projection reconstruction, so as to achieve better data throughput rates while at the same time keeping the speed requirements (and the accompanying power consumption) within reasonable bounds.

CT scanners use a fan beam energy source, a central ray of which is projected through a particular point in space near the center of the object being scanned, as the energy source is stepped around a circular locus with center at that particular point in space. An arcuate strip of detector elements is located opposite the energy source on the other side of that particular point in space from the energy source and tracs the rotation of the energy source about that particular point in space. The object being scanned is always within the fan beam and absorbs a portion of the radiant energy in each contiguous segment of the fan beam, with the remnant radiant energy or "ray sum" in each segment of the fan beam being measured by a respective detector on the arcuate detector strip. The detector responses for each successive increment of rotation of the energy source and its opposing arcuate detector strip constitutes a separate "view" of the object being scanned. These detector responses during the successive views are stored in memory, since processing of these responses is not done in real time but rather is done after the scan is completed. During this subsequent processing the detector responses from each view are preweighted and prefiltered with a carefully formulated finite-impulse filter kernel before being back projected into the image space to generate the gray scale values of the image picture elements or "pixels". The ray sums passing through each pixel center during each view are weighted and summed to create the gray scale value of the pixel by back projection. That is, since each ray sum represents the sum of the energy absorbed from a bundle of rays forming a segment of the fan beam in its traverse through successive portions of the object including the portion at which the pixel is located, the magnitude of the energy absorption ascribable to any one of the pixels traversed by that segment of the fan beam can be ascertained by performing an autocorrelation procedure involving all of the ray sums for bundles of rays passing through that pixel. This autocorrelation procedure suppresses the shadows cast by the pixels before and after the pixel of interest in the ray sums, which is the essence of producing a tomogram by computed tomography. In the additive combining of ray sums involved in implementing this autocorrelation procedure, each ray sum must be weighted to take into account the divergence of the fan beam before the ray packet associated with that pixel passes through that pixel.

A paper "Convolution Reconstruction Techniques for Divergent Beams" by G. T. Herman, A. V. Lakshminarrayan and A. Naparstek appearing on pages 259-271 of COMPUTER BIOLOGIC MEDICINE, Vol. 6, Oct. 1976, is of interest. So is a paper "Rapid Execution of Fan Beam Image Reconstruction Algorithms Using Efficient Computational Techniques and Special Purpose Processors" by B. K. Gilbert, S. K. Kenue, R. A. Robb, A. Chu, A. H. Lent and E. E. Swartzlander, Jr. appearing on pages 98-115 of the IEEE TRANSACTIONS ON BIOMEDICAL ENGINEERING, Vol. BME-28, No. 2, Feb. 1981. From these papers one can draw the following equations, which describe fan beam filtered back projection for a fan-beam CT scanner that uses an arcuate detector strip opposite the x-ray source rotating around the object being scanned.

$$f(r,\theta) = \sum_{v=0}^{V-1} W_{v,(r,\theta)} D_{v,K(r,\theta,v)} \quad (1)$$

$$W_{v,(r,\theta)} = U^{-2}(\beta_{(v+1)} - \beta_{(v-1)})/2 \quad (2)$$

$$U^2 = [r\cos(\beta_v - \theta)]^2 + [E + r\sin(\beta_r - \theta)]^2 \quad (3)$$

$$K_v(r,\theta) = (\alpha)^{-1}\tan^{-1}\{r\cos(\beta_v-\theta)/[E + r\sin(\beta_v-\theta)]\} \quad (4)$$

The value $K(r,\theta,v)$ used as a subscript in equation (1) is for a particular view v identical to the value $K_v(r,\theta)$ in equation (4), the $K(r,\theta,v)$ notation being used to avoid a double subscription in equation (1). $D_{v,K(r,\theta,v)}$ will be simply referred to as $D_{v,K}$ in the text that follows.

In equation (1) the function $f(r,\theta)$ is the density of the object at a picture element (or "pixel" of an x-ray image reconstructed by back-projection, which pixel, has its center at polar coordinates $r,\theta$. These $r, \theta$ polar coordinates and a set of x, y Cartesian coordinates have a common origin, about which the source of x-ray fan beam and its opposing arcuate strip of x-ray detectors are considered to rotate. The x and y coordinate axes are considered to be horizontal and vertical, respectively, with the radial coordinate r equaling $(x^2+y^2)^{\frac{1}{2}}$ and with the angular coordinate $\theta$ being the counterclockwise angular displacement measured from the x axis. The number v is the number indicating which of V views consecutively ordinally numbered zeroeth through $(V-1)^{th}$ is being considered, and the point source from which the fan beam is considered to emanate steps a circular locus of radius E in $\alpha$ angular increments during successive ones of these view. The back-projection weight $W_{v,(r,\theta)}$ is calculated taking into account the dispersion of energy in the fan beam with distance from the x-ray source, as provided for by the $U^{-2}$ term thereof, and taking into account the fraction of the x-ray source energy within each segment of the fan beam, as provided by the $(\beta_{(v+1)}-\beta_{(v-1)})/2$ term thereof. U is the distance traversed by a straight line ray in going from the origin of the fan beam to the pixel of interest, and $\beta$ is the angle this ray makes with the y axis as it goes from the origin of the fan beam to a point on the arcuate x-ray detector strip. $(\beta-\theta)$ can be shown to be the angle between the central ray of the fan beam and the ray sum passing through the point $r, \theta$ at which $f(r,\theta)$ is being evaluated.

The index K takes on successive integral values as a bundle of rays defining a segment of the fan beam impinges directly on a successive one of the detectors p in number that are aligned along the arcuate detector strip. For an integral value p the function $D_{v,K}$ is the (pre-weighted and pre-filtered) response of the detector that segment of the fan beam impinges directly on during that particular view. The pixel center is usually so located that the ray sum for the bundle of rays passing through the pixel location does not directly impinge on one detector, but directly impinges at a location overlapping portions of two adjacent detectors. According, $D_{v,K}$ is often sought where K equals $p+\delta$ where p is the integral portion of K and $\delta$ is the fractional portion of K. The function $D_{v,K}$ is then evaluated by interpolation. For example $D_{v,K} = D_{v,(p+\delta)}$ can be evaluated by linear interpolation as follows.

$$D_{v,(p+\delta)} = D_{v,p} + \delta(D_{v,(p+1)} - D_{v,p}) \quad (5)$$

For a 512-pixel-by-512-pixel image there are about 250 million multiplications and additions involved in equation (1). About the same number of calculations are required for evaluating $K_{v(r,\theta)}$ and $W_{v,(r,\theta)}$.

The inventor discerns that v points located the same radial distance r from the origin but at different angular coordinates $\theta$ will, during respective ones of the views v, each have the same $\beta_v - \theta$ value associated therewith, making the $W_v$ and $K_v$ values associated therewith the same. By phasing the calculations of $f(r,\theta)$ for these v points properly in v coordinates, a respective value of $W_v$ and a respective value of $K_v$ can be calculated which can be used in one of the steps of the accumulation used for calculating $f(r,\theta)$ for each of these v points—or for selected ones of these v points that have coordinates that are integer values in the coordinate system used to address the display image memory associated with the CT scanner.

SUMMARY OF THE INVENTION

A method for parallel computation of the density functions $f(r,\theta)$ for m picture elements at a time, in accordance with the fan-beam back-reconstruction algorithms, embodies an aspect of the invention. This method is used to generate density functions that are subsequently stored in an image memory. The method is used to further process data originating from a tomographic scanner having a fan beam energy source and an opposing arcuate strip of detectors, both exhibiting relative rotation in equal angular increments during a succession of scanning views, v in number, around a point of origin. The detector responses for each of the successive scanning views are, after pre-convolution processing and convolution with a filter kernel stored in a memory for D(v,p) values. The m image picture elements for which density functions are to be calculated in parallel are selected so as to be equally distant from the point or origin and to have integral coordinates insofar as concerns the addressing of the image memory during its writing with those density functions. Weights for correcting for fan beam divergence are successively calculated, each of which weights is associated in common with each of said m selected image picture elements in a respective one of the V views thereof. The order of calculating these weights establishes the scanning paths through the stored detector responses to be followed in accumulating density functions for each of the m selected image picture elements, in which paths the angle between the ray sum passing through each of the m selected image picture elements and the central ray of the fan beam for their respective views is the same in all m cases. The density functions of the m selected elements are determined in parallel by interpolation from the stored detector responses, using like-valued interpolation coefficients calculated in common for all m selected image picture elements. The products of each successive weight times the density functions for the m selected image picture elements are accumulated, as these m image picture elements progress over their respective scanning paths through the stored detector responses.

A computer embodying the invention in one of its aspects is for use with a tomographic scanner having a fan beam source and opposing arcuate strip of detectors, both exhibiting rotation in equal angular amounts during a succession of scanning views V in number around a point of origin. This computer computes, in parallel, in accordance with the fan-beam back-projection reconstruction algorithm, density functions for each of successive sets of m image picture elements associated with spatial positions equidistant from the point of origin. A memory is included in the computer for storing filtered responses of the detectors for each of the areas, which memory has m portions respectively storing m bands of successive views, m being a positive plural integer. A set of m processing elements respectively associated with portions of this memory respectively accumulate density functions from the successive products of (1) weighting functions supplied them in common and (2) detector responses drawn from their respective portions of memory in accordance with a stored index of ray angle. A sidelines processor generates the weighting functions and the shared indices of ray angle for all of the m processing elements over a range including a $(1/m)^{th}$ segment of a circle. Means are provided for passing the accumulated density function from each of the m processing elements to a successive one of them after accumulating over each $(1/m)^{th}$ segment, said passing being done m times for each parallel computation of m density functions.

BRIEF DESCRIPTION OF THE DRAWING

FIG. 5 indicates how partial sums are successively accumulated in the eight processing elements of the FIG. 4 combination.

DETAILED DESCRIPTION

In a fan beam scanner commercially available from General Electric Company x-rays fan out over an angle of forty-six degrees that spans 730 detectors. For a complete scan 984 views are taken, as the x-ray source and its opposite arcuate detector strip of 730 detectors complete in 984 increments, each $2\pi/984$ radians, a full circle of relative rotation about the object being x-rayed. The object being x-rayed is kept entirely within the fan beam during all views.

Figure 1:
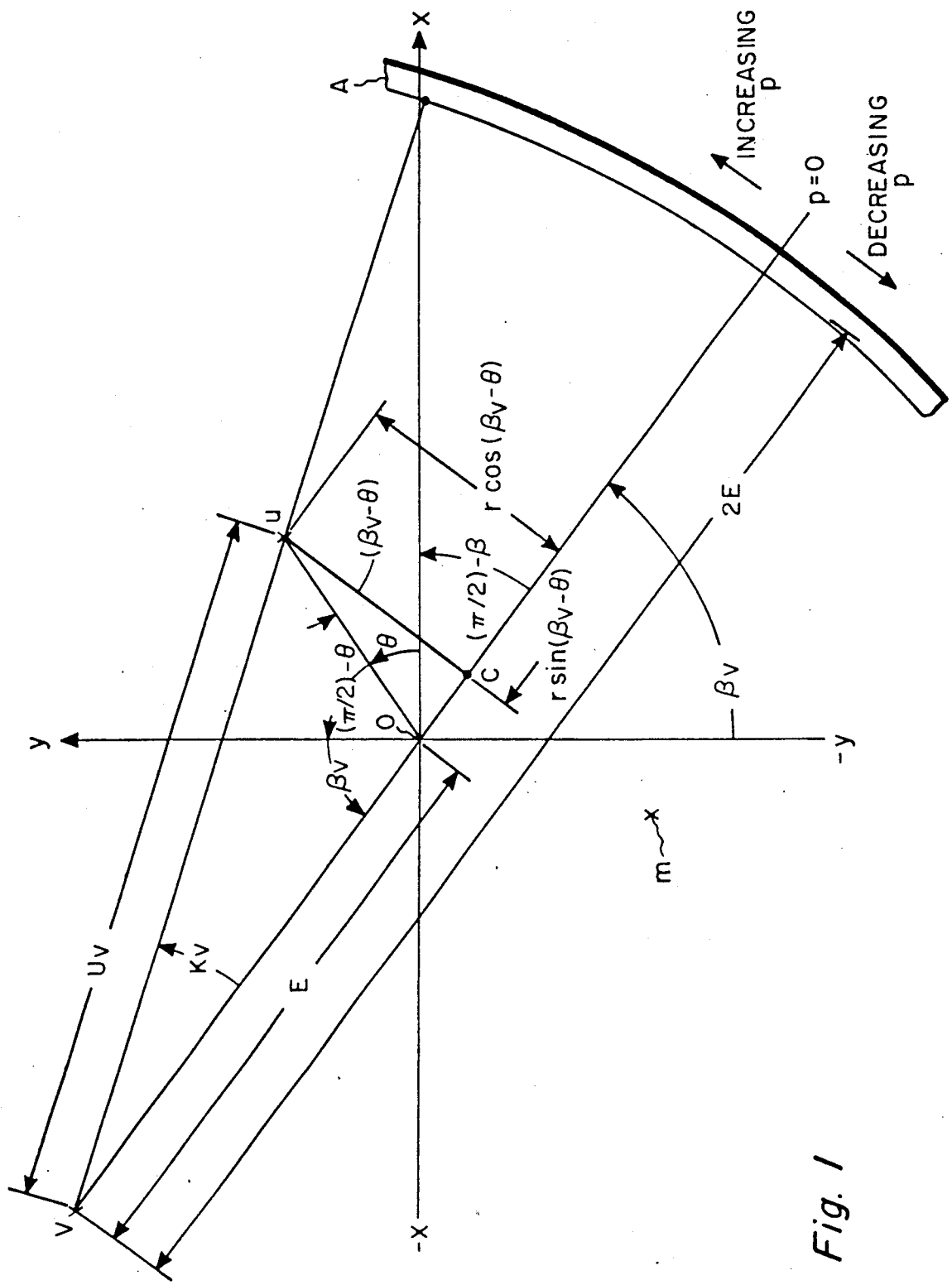
FIG. 1 is a graph of the geometry of fan beam scanning and back-projection.

FIG. 1 shows the geometry of fan beam scan on a coordinate axis in which the x-rayed object is considered as being stationary. The x-ray energy source is considered to follow a locus of points v on a circle of radius E about the common origin of the x, y and r, $\theta$ coordinate systems with the central ray of the fan beam forming an angle $\beta_v$ with the y coordinate axis. That is, the polar coordinates of the x-ray fan beam source are a radial coordinate E and an angular coordinate $\beta_v+90°$. The arcuate detector strip A has a radius of 2E about a center at the point v.

The polar coordinates of the pixel u for which calculations are made are a radial coordinate r and an angular coordinate $\theta$, and U is the distance of the pixel u from energy source position v. A perpendicular to the central ray extends from pixel u to point c to define a right triangle with corners at c, u and the origin o. The angle between the central ray and the x axis is the supplement $90°-\beta_v$ of the angle $\beta_v$, so the interior angle uoc between lines oc and ou is $90°-\beta_v+\theta$. Since the sum of the interior angles of a triangle is 180°, and since the angle ocu is a right angle of 90°, the sum of angles uoc and ouc is 90°. So the angle ouc is $(\beta_v-\theta)$. The length of line uc is therefore $r \cos(\beta_v-\theta)$, and the length of the line oc is $r \sin(\beta_v-\theta)$. Equation (3) is derived by applying the Rule of Pythagoras to the triangle vcu.

$\alpha K(r,\eta)$ is the angle between the ray passing from the energy source position through the origin and the ray passing from the energy source position through the pixel of interest. The arcuate detector strip has a radius of 2E from a center at the position of the energy source. Accordingly, each detector subtends the angle $\alpha$, so integral values of $K(r,\theta)$ indicate respective detector positions, either that one centered at the extension of the ray passing from the energy source position through the origin or one of the other contiguous detectors flanking the central detector. These integral values of $K_{r,\theta}$ are zero for the central detector, positive integers for detectors flanking that central detector in the counter clockwise direction, and negative integers for detectors flanking that central detector in the clockwise direction. Equation (4) is readily derived by applying the definition that the tangent of an interior angle uvo of a right triangle uvc is the ratio of the opposite side uc divided by the adjacent side vc.

Figure 2:
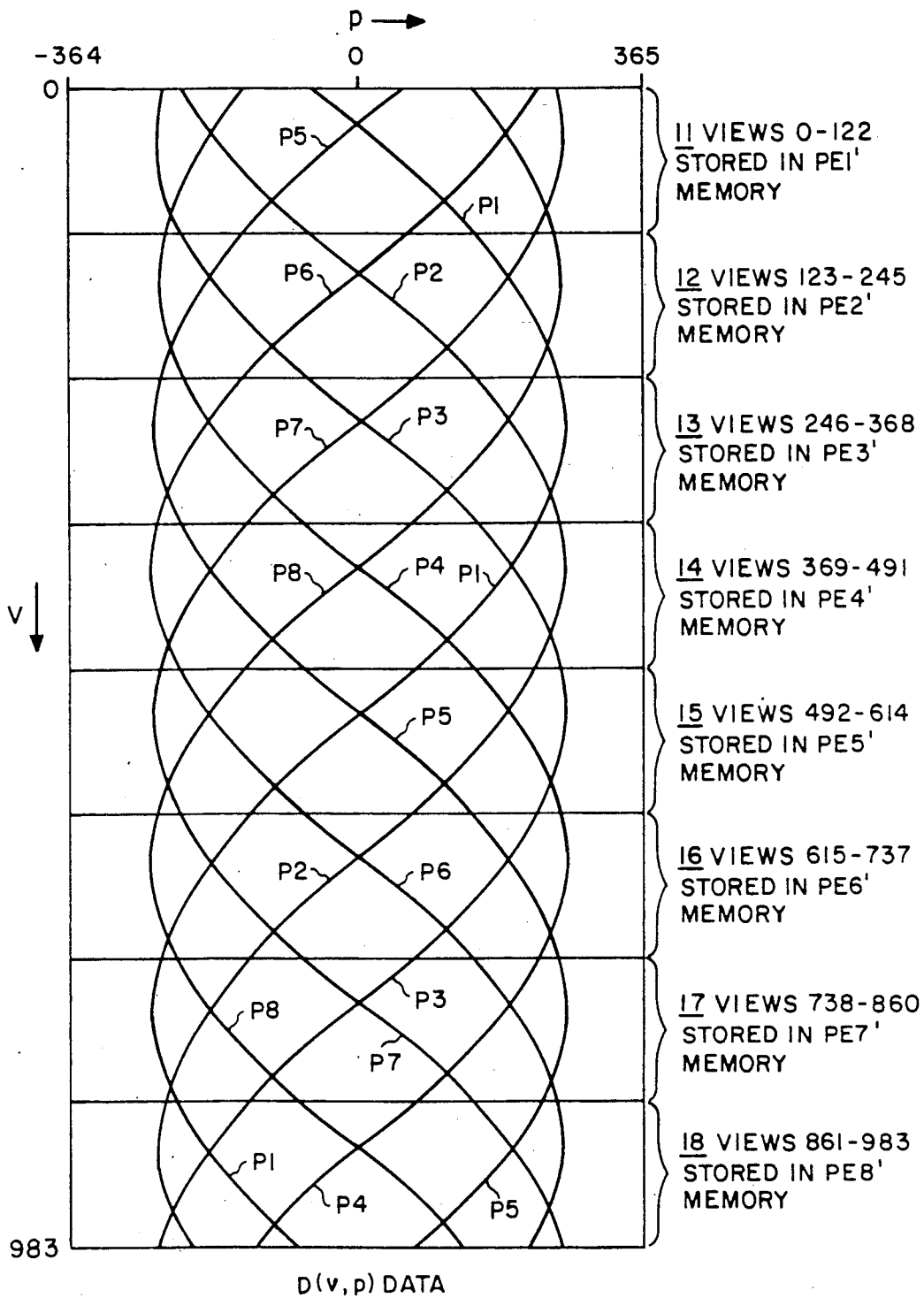
FIG. 2 is a diagram of the detector data set generated by fan beam scanning and stored memory.

FIG. 2 shows the data set D(v,p) developed by the fan beam scanner and stored in memory. The data set D(v,p) is arranged by horizontal rows consecutively numbered 0, 1, 2, ... (V-1), and by vertical columns consecutively numbered $-p, -(p-1)..., -2, -1, 0, 1, 2, ..., (p-1), p$ (which individual rows and columns are not depicted because of drafting limitations). Each row is identified with a respective one of the successive views, the zeroeth one taken for $\beta_{v=0}=0$. There is a respective row of p detector responses (D(v,1), D(v,2), ... D(v,p-1), D(v,p), for each view v taken at an incremental advance in fan beam source angle, which detector responses are provided from respective ones of the detector responses are provided from respective ones of the detectors arcuately arrayed opposite the fan-beam x-ray source. It is desired to develop from this data source an image that is a square row by column array of $Z^2$ picture elements (pixels).

The paths through stored D(v,p) data describing eight image picture elements $P_1-P_8$ respectively are shown superposed on the data set. These paths are not sinusoidal, owing to the detector strip being arcuate rather than following a straight-line perpendicular to the central ray of the fan beam; rather they are projections of lines of length $r \cos(\beta-\theta)$ onto the arc detector. These paths are idealized in that they assume infinite resolution in p. Image picture elements $P_1-P_8$ are at equal radii from the axis of scanner rotation and have Cartesian coordinates (a, b), (b, a), (-b, a), (-a, b), (-a, -b), (-b, -a), (b, -a) and (a, -b), respectively.

The particular nature of these image picture elements will be considered in further detail later on in this specification.

For computing a 512 pixel by 512 pixel image from the 983-view by 730-detector data array D(v,p), about 250 million multiplications and additions are involved in computing f(r,θ) of the back-projection reconstruction in accordance with equation (1). A similar number of steps is involved in the calculations of $K_{v,(r,\theta)}$ in accordance with equation (2) and of $W_{v,(r,\theta)}$ in accordance with equations (3) and (4). The back-projection reconstruction calculations comprise about 80% of the total number of calculation steps taken in computing the 512 pixel by 512 pixel image; the preceding fast Fourier transform (FFT) filtering calculations using convolution comprise about 10% of that total number; and the preconvolution processing steps before FFT filtering comprise the remaining 10% or so of that total number of calculations. Calculating $K_{v,(r,\theta)}$ and $W_{v,(r,\theta)}$ on an octantal, rather than full-circle, basis can reduce the total number of calculation steps by about 35%.

Figure 3:
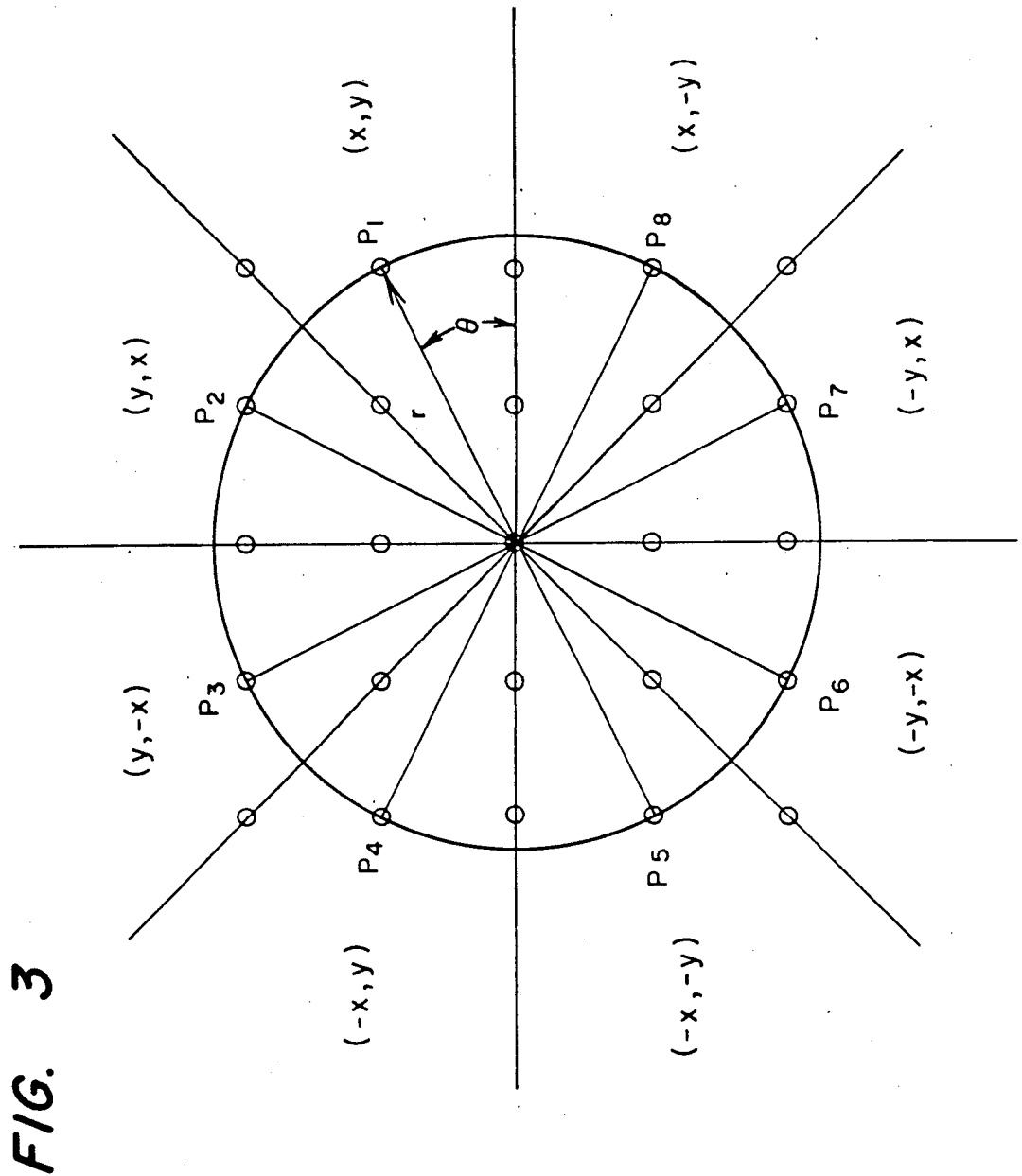
FIG. 3 is a graph of a two-dimensional plane useful in understanding the octantal symmetry utilized in the invention.

FIG. 3 is a graph of a two-dimensional plane of points illustrating an octantal symmetry associated with Cartesian coordinates that can be exploited in computing $K_{v,(r,\theta)}$ and $W_{v,(r,\theta)}$. Cartesian coordinate axes x and y of the plane are shown, which plane corresponds to the fan-beam field plane shown in FIG. 1 insofar as spatial orientation is concerned. This plane of points with Cartesian coordinates having integer values can also be identified with storage locations in an image memory used for storing f(r,θ) pixel values as they are calculated. After computations have been completed, the storage locations of this image memory can be raster-scanned, on a recurrent basis to support a video display device, or on a one-time basis to write to an image recording device such as a disk. P1 is a grid point located at the Cartesian coordinates a, b in the octant bounded by the angular polar coordinates 0° and 45°, a and b being integers. For the purposes of considering octantal symmetry, it has corresponding grid points $P_2-P_8$ having Cartesian coordinates (b, a), (−b, a), (−a, b), (−a, −b), (−b, −a), (b, −a) and (a, −b), respectively. In terms of polar coordinates (r, θ) these grid points $P_1-P_8$ can be expressed as follows:

$$P_i = r, (i-1)(\pi/4) + \theta_1 \text{ for } i = 1, 3, 5, 7 \quad (5)$$

$$P_i = r, (i\pi/4) - \theta_1 \text{ for } i = 2, 4, 6, 8 \quad (6)$$

The grid points described by eq. (5) are called odd points, while those described by eq. (6) are called even points.

Returning to FIG. 1, suppose point u is identified with point $P_1$ having Cartesian coordinates a, b where a and b are both integers. Point u is in the first octant extending from the positive x axis 45° clockwise. At view v+246, supposing there are 984 views, there is a 90° rotation of the energy source and the opposing detector strip, and point $P_3$ at Cartesian coordinates −b,+a has the same values of U, K and W associated therewith as point $P_1$ has in view v. At view V+492 there is an additional 90° rotation of the energy source and the opposing detector strip, and point $P_5$ at Cartesian coordinates −a,−b has the same values of U, K and W associated therewith as point u has in view v. At view v+738 there is another additional rotation of the energy source and the opposing detector strip, and point $P_7$ at Cartesian coordinates −b, −a has the same values V, K and W associated therewith as point a has in view v. That is, since both $\beta_v$ and θ have incremented by the same multiple of 90° the angle ($\beta_v - \theta$) is the same for all four points.

Indeed ($\beta_v - \theta$) is the same for a ring of points with coordinates r, $\theta + \beta_v$ that occur in successive views. $P_1-P_8$ are those points on the ring which have Cartesian coordinates each of integral value. The points $P_2$, $P_4$, $P_6$, $P_8$ have the same U value associated with each of them as the odd points $P_1$, $P_3$, $P_5$, $P_7$. Each of the even points has the same K value associated with each of them which is the same in amplitude as but opposite in polarity from the K value associated with each of the odd points. So contributions to eight pixels $P_1-P_8$ can be calculated in parallel, using the same successions of W and |K| values, with the phasing of the views being calculated being in 90° $\beta_v$ intervals between successive ones of the odd points $P_1$, $P_3$, $P_5$, $P_7$ and between successive ones of the even points $P_2$, $P_4$, $P_6$ and $P_8$. The same ($\beta_v - \theta$) value as for the odd points $P_1$, $P_3$, $P_5$, $P_7$ respectively occurring in views v, v+246, v+492 and v+738 is found for the even points respectively occurring in views 984-v, 738-v, 492-v and 246-v. So f(r,θ) for the odd points $P_1$, $P_3$, $P_5$, $P_7$ is accumulated as v increments through a succession of views in the FIG. 2 D(v,p) array while the f(r,θ) for the even points $P_2$, $P_4$, $P_6$, $P_8$ is accumulated as v decrements through a reverse-order succession of views in the FIG. 2 D(v,p) array. At any time the $\beta_v$ for each of the points $P_1-P_8$ is in a separate successive one of the octants of the range for β. These observations concerning points $P_1-P_8$ are in accordance with the path these points follow through the stored D(v,p) data, as depicted in FIG. 2.

Figure 4:
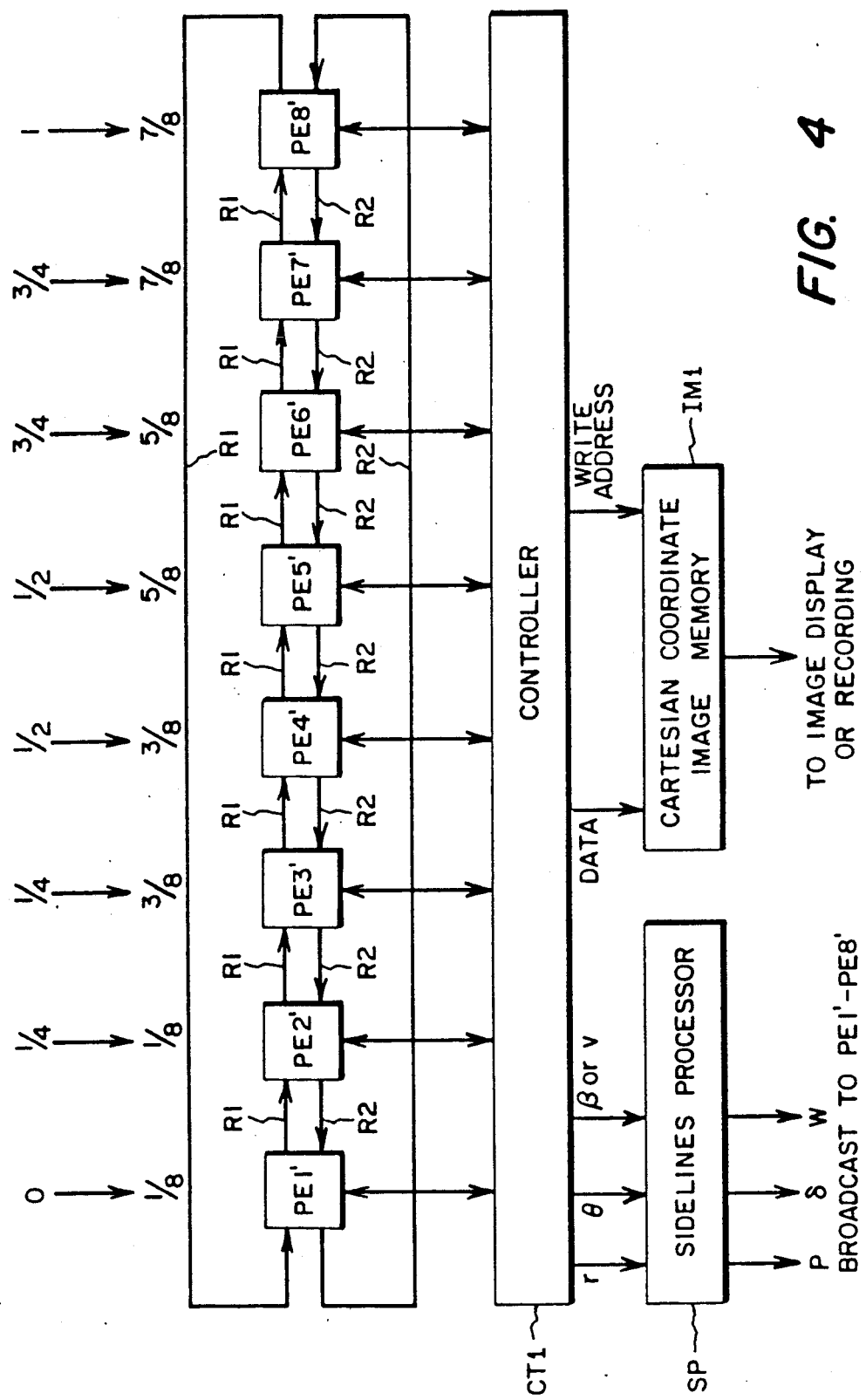
FIG. 4 is a schematic diagram of a back-projection computer including a linear processing array with eight processing elements for calculating $f(r,\theta)$ in parallel eight points at a time in combination with a Cartesian coordinate image memory and with a single sidelines processor for calculating $K_{v,(r,\theta)}$ and $W_{v,(r,\theta)}$, which combination embodies the invention.

FIG. 4 shows a linear processing array with eight processing elements PE1', PE2', PE3', PE4', PE5', PE6', PE7' and PE8' operated parallely in time each to accumulate D(v,k) in accordance with equation (1) for a separate one of points $P_1 - P_8$ as it circulates through processors PE1-PE8. A controller CT1 performs a plurality of control functions in the apparatus including the generation of the x,y coordinates of $P_1-P_8$ to be used to address a Cartesian-coordinate image memory IM1 as data descriptive of the f(r,θ) of these points are written as data into memory IM1 under command of controller CT1.

The FIG. 2 D(v,p) array is partitioned into eight equal segments, each corresponding to an octant of the angle β variable. A first segment 11 stored in PE1' memory contains rows 0–122 of D(v,K) a second segment 12 stored in PE2' memory contains rows 123–245 of D(v,K), a third segment 13 stored in PE3' memory contains rows 246–368 of D(v,K); a fourth segment 14 stored in PE4' memory contains rows 369–491 of D(v,K); a fifth segment 15 stored in PE5' memory contains rows 492–614 of D(v,K); a sixth segment 16 stored in PE6' memory contains rows 615–737 of D(v,K); a seventh segment 17 stored in PE7' memory contains rows 738–860 of D(v,K) and an eighth segment stored in PE8 memory contains rows 861–983 of D(v,K). These memories are written with D(v,p) data that have been subjected to pre-convolution processing and convolution with R(p) kernel, using apparatus not shown in FIG. 4.

Controller CT1 includes scan generators for generating r,θ and β scan values supplied to a sidelines processor SP. The values r,θ are the polar coordinates of point $P_1$, and the angle β increments by α each successive view v. Sidelines processor SP calculates $K_{v,(r,\theta)}$ and $W_{v,(r,\theta)}$ for $P_1$, and controller CT1 broadcasts samples of each of them every two cycles to each of the processing elements PE1'-PE8'. These procedures provide an eight-fold reduction in the time taken up by the calculation of $f(r,\theta)$. Since eighty percent of the time for serially calculating CT images per prior art practice is in the back-projection reconstruction computation, apportioning the calculation of D(v,K) among the eight processors, one for each octant of $\beta$ cuts overall computation time 70%.

The v-scanning direction of D(v,p) memory for processing elements PE2', PE4', PE6' and PE8' is reversed from what it is for processing elements PE1', PE3', PE5' and PE7'. This is done because, as noted before, the v-scanning directions to increase $(\beta_v - \theta)$ is opposite for odd pixels and for even pixels. The arrows above the processing elements indicate these opposite directions of scanning in v in the respective processing elements PE1'-PE8' and the fractions indicate the boundaries of D(v,p) memory portions scanned in each of the processing elements PE1'-PE8'. Processing elements PE1'-PE8' are interconnected in a prescribed order with a pair of opposite-direction ring busses R1 and R2. To accumulate all values of $W_{v,(r,\theta)} D_{v,K(r,\theta)}$ needed to define a back-projected pixel value $f(r,\theta)$ partial sums must be passed along through all eight of the processing elements PE1'-PE8'. Controller CT1 controls this passing of data and the application of the fully accumulated $f(r,\theta)$ values from processing elements PE1'-PE8' to a Cartesian coordinate to the Cartesian-coordinate image memory IM1.

The sidelines processor SP is best realized using a custom monolithic integrated circuit, the design of which is well within the capabilities of those skilled in the arts. By allocating the calculations per equations 2-4 to the custom sidelines processor, the remaining calculations can be carried out in parallel using off-the-shelf monolithic integrated circuits. The processing elements PE1'-PE8' are easily implemented, for example, using transputers manufactured by INMOS, which have four input/output ports. A respective monolithic integrated circuit memory for storing an octant of D(v,p) data is associated with each transputer monolithic integrated circuit.

FIG. 5 table indicates how partial sums for points $P_1$-$P_8$ are successively accumulated in each of the processing elements PE-1-PE8 during time periods T1-T8 respectively as the ray passing from the polar coordinate zero through each point sweeps through a full circle. Note that between octant scans the odd points $P_1$, $P_3$, $P_5$, $P_7$ are passed counter-clockwise on one of the two ring busses, and that the even points are passed clockwise on the other of the ring busses.

In actual practice a still greater reduction in CT image computation time is required. The principles of apportioning the calculations as thusfar described are still adhered to, but rather than serially calculating the sets of $f(r,\theta)$ values associated with respective rings of points, a number n more than one of such sets of $f(r,\theta)$ values are calculated at a time. The eight processing elements in each set share the same D(v,p) memory. The number of sideline processors for calculating $K_{v,(r,\theta)}$ and $W_{v,(r,\theta)}$ values is increased to n as well, a respective sideline processor providing those values for each set of eight processing elements associated with performing calculations for a respective ring of points.

The scan generator for generating $P_1$ points usually generates the x, y coordinates of those points, then performs a subsequent real-time scan conversion to generate the r,$\theta$ coordinates. This real time scan conversion can be done by just using look-up tables stored in a memory or by using calculation augmented by look-up tables stored in memory. Since an octant of Cartesian coordinate space cannot be raster scanned with even length rows insofar as the number of evenly spaced points therein is concerned, a stratagem must be devised for successively addressing each memory address in the octant as apportioned among the n parallelly operated sets of eight processors. When n is one and only eight processors parallelly operate to accumulate $f(r,\theta)$ values for eight points at a time, the scan of addresses can be easily effected by augmenting the number of address locations per row by one for each row of the octant that is scanned. When n is greater than one, this same general scheme can be used, except for starting and stopping each of the scans at different rows. The n sets of calculations will take slightly different amounts of time, of course. Alternatively, where n is greater than one, the parallel scannings of image memory address locations in the octant can be done using scan generators that sequentially scan lists of address locations as stored in memory, and the address lists for the n scan generators are made substantially the same length.

A simpler course to take in implementing the invention, however, is only to take advantage of quadrantal symmetry of $\beta_v - \theta$, rather than octantal symmetry, calculating $f(r,\theta)$ in 2 n sets of four processors, since pixel locations in the quadrants can be raster-scanned in rows of equal length in terms of number of pixel locations per row. Subdividing such a quadrant scan, either by dividing the rows into groups or by dividing the rows into subrows, is simple to do. Processing in sets of four processors, there is no longer need to provide for reversed direction of v-scanning the D(v,p) array in alternate ones of the processing elements, since only odd or only even points are processed, and only one ring bus threads through the four processing elements to implement the passing of partial accumulation results from each to the next.

Another approach that can be taken in alternative embodiments of the invention is to store the calculated image in an image memory addressed in polar, rather than Cartesian, spatial coordinates. This image memory can then be phantom raster scanned by converting raster scan in Cartesian coordinates to polar coordinates having higher spatial resolution than the polar address coordinates of image memory and performing interpolation among image data drawn from the closest by polar coordinates that do address locations in image memory. This technique is described by C. H. Strolle in U.S. Pat. No. 4,471,349 issued Sept. 11, 1984 and entitled "PHANTOM RASTER GENERATING APPARATUS SCANNING TV IMAGE MEMORY IN ANGULAR AND ORTHOGONAL COORDINATES". Where this is done the polar coordinates used in calculating $f(r,\theta)$ will be those polar coordinates used as addresses for the polar coordinate image memory. An advantage of an image memory addressed in polar coordinates, Strolle points out, is that images can be rotated with ease by simply offsetting the angular coordinates used to address memory. While Strolle specifically describes the use of bilinear interpolation in the phantom raster scan, similar procedures may be used to implement bicubic interpolation or other higher order two-dimensional interpolation.

A property of an image memory addressed in Cartesian coordinates, as previously considered, is that such an image memory samples image space at uniform intervals in each of the orthogonal coordinates used for addressing it. In an image memory addressed in polar coordinates, angular resolution is higher for pixels with smaller radial coordinates than for pixels with higher radial coordinates. Pixel size is roughly $\Delta r$ by $r\Delta\theta$, $\Delta\theta$ having no fixed spatial distance associated therewith. So, to obtain adequate spatial resolution for larger radial coordinates, the image memory can become somewhat larger in number of addressable locations than a Cartesian-coordinate image memory affording the same spatial resolution as the polar coordinate image memory affords pixels with larger radial coordinates. If this foveated spatial resolution in the image memory is not desired, the polar-coordinate image memory can be divided into a number of concentric image memories respectively addressed by different ranges of radial coordinates, and those polar coordinate image memories addressed by ranges of lesser radial coordinates can be addressed with angular coordinates affording lesser angular resolution. Where this is done rings closer to the polar coordinate origin do not need to be calculated to as high an angular resolution as rings further from the coordinate axis.

Polar-coordinate image memory lends itself particularly well to use of the invention. In part this is because the problem of regularly scanning a segment of a circular range other than a half or quadrant is less difficult than in Cartesian coordinates. And in part, this is because $\sin(B_v-\theta)$ and $\cos(B_v-\theta)$ values used in the calculations can be tabulated or accumulated without having to take into account pixel locations non-uniformly incrementing in polar coordinates, owing to these pixel locations having been originally specified in Cartesian coordinates, where their incrementation is uniform. All one has to do is (1) make minimal intervals in $\theta$ the same as they are in $\beta$ and (2) divide the circular range into angles that are a multiple of this minimum angular interval.

More importantly, the number of pixels having their centers at the same distance from the origin is in general many more than eight, allowing the $D(v,p)$ map to be more finely divided among processors. For example, the 984 views in the $D(v,p)$ array may be apportioned in the twenty-four segments of forty-one views. Odd points $P_{1+i}$ at polar coordinates $r$, $\theta + i\,30°$ for i being successive even integer values zero to twenty-two and even points $P_{2+j}$ at polar coordinates $r$, $-(\theta+j\,30°)$ for j being successive even integer values zero to twenty can be calculated in parallel in twenty-four processing elements having those respective segments stored in their respective memories. The direction of v-scanning is alternated in the $D(v,p)$ memories of successive ones of the processing elements interconnected by double ring busses for passing partial accumulation results. Alternatively, the twenty-four processors may be connected only by a single ring bus for passing partial accumulation results, and the processors can be used to calculate $f(r,p)$ for points P at polar coordinates $r$, $\theta + i\,15°$ for i being successive (i+1) integer values zero to twenty-three. In either case, only one sidelines processor is needed for the twenty-four parallel processing elements. Only one sidelines processor is needed also if one apportions the 984 views in the $D(v,p)$ array in forty-one segments of twenty-four views for calculating points at $r$, $\theta + i\,2\pi/41$ for i being successive integer values zero to forty stored in the memories of forty-one processing elements calculating in parallel.

Figure 6:
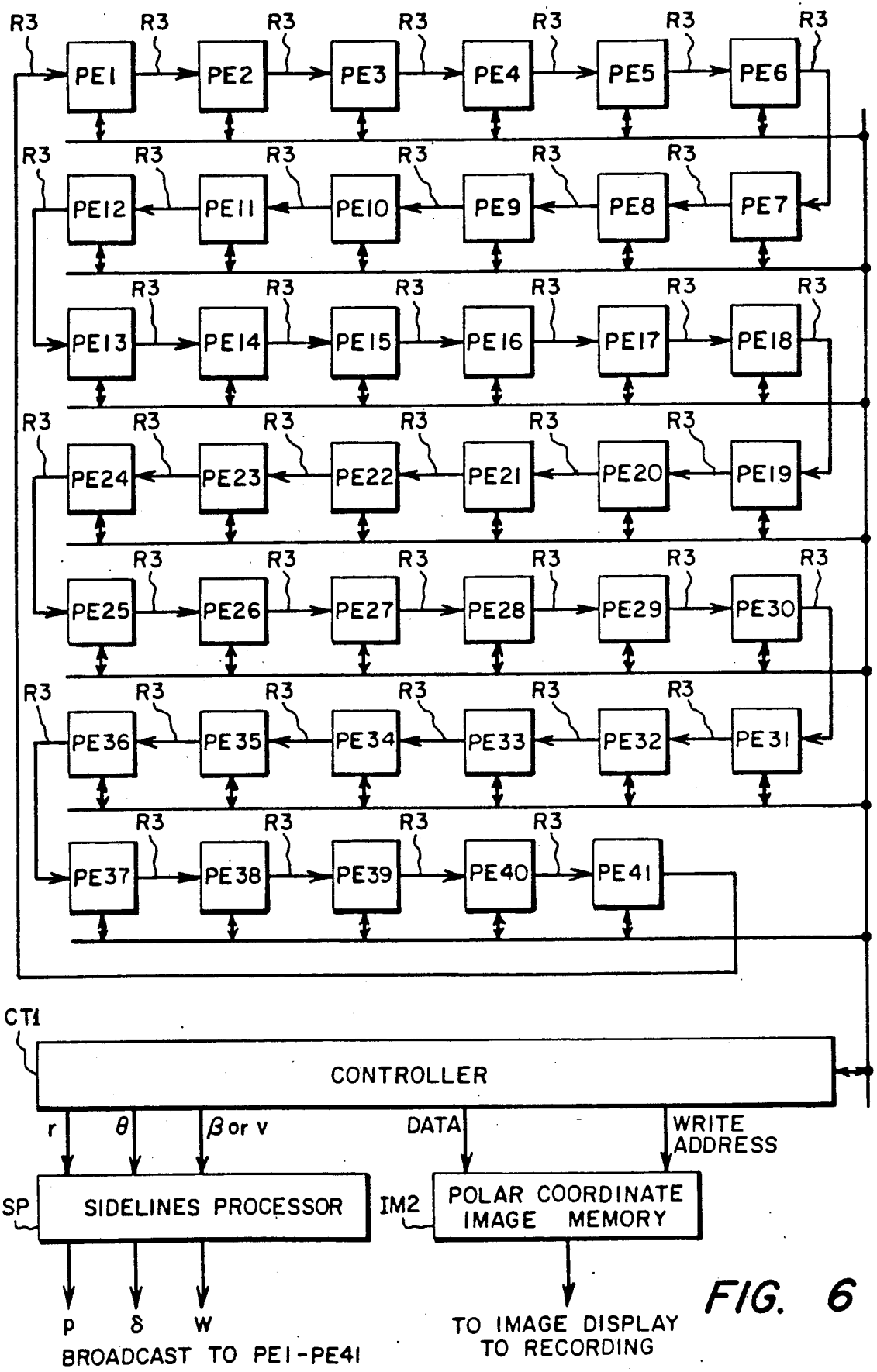
FIG. 6 is a schematic diagram of a back-projection computer including a linear processing array with forty-one processing elements for calculating $f(r,\theta)$ in parallel forty-one points at a time, in combination with a polar-coordinate image memory and a single sidelines processor for calculating $K_{v,(r,\theta)}$ and $W_{v,(r,\theta)}$, which combination embodies the invention.

FIG. 6 shows such a linear processor array having forty-one processing elements PE1-PE41 and a single sidelines processor SP, communication among which is controlled by a controller CT2. Processing elements PE1-PE41 share a single ring bus R3 for passing $f(r,\theta)$ accumulations from each to the next. A polar coordinate image memory IM2 is used, so controller CT2 does not generate x,y Cartesian coordinates for addressing image memory during its writing, but rather supplies image memory IM2 with the $r,\theta$ coordinates of a point P1.

Figure 7:
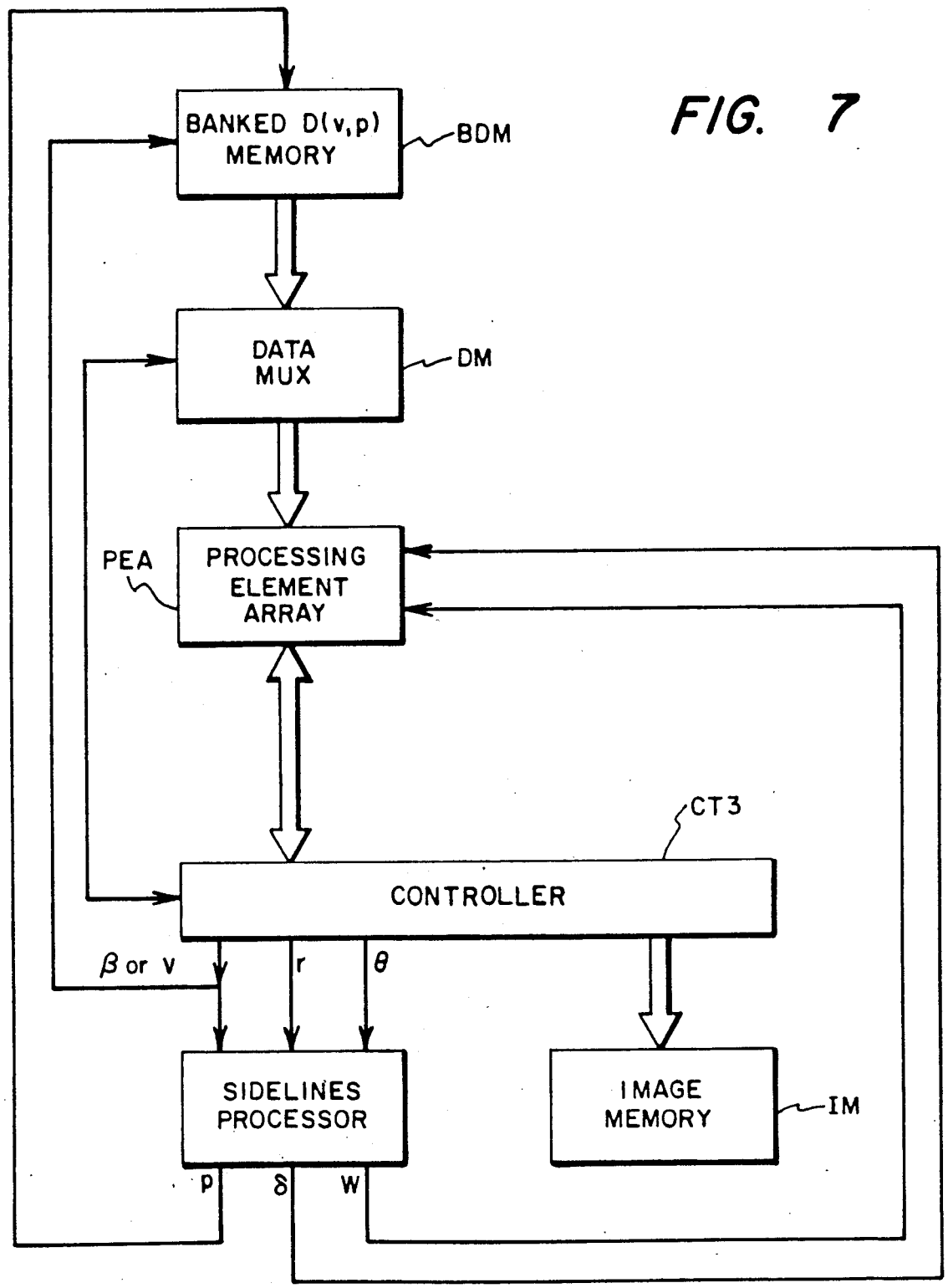
FIG. 7 is a schematic diagram of an alternative structure which embodiments of the invention may take.

FIG. 7 shows an alternative architecture that may be used in implementing the invention. The array PEA of processing elements is one where each of the parallel $D(v,k)$ accumulations takes place entirely within a single processing element. $D(v,p)$ memory is not local to the processing elements, but rather is a banked memory BDM apportioned to the processing elements through a data multiplexer DM under control of the controller CT3. That is, instead of passing accumulation results to processing elements having associated with them the next bands of $D(v,p)$ data to be traversed, the bands of $D(v,p)$ data are passed to processing elements accumulating results in place. Controller CT3 may be of a type adapted for use with image memory IM that is addressed by Cartesian coordinates or by polar coordinates. The multiplexer DM can be realized using crossbar switches, for example.

In prior-art medical CT using a fan-beam scanner, a technique that is practiced is the placing of the patient so that the body part of particular interest is in one quadrant of the circular scan, and then doing back projection calculations for just that one quadrant of the image field, thereby quartering the time taken for back-projection calculations. Doing back-projection calculations in accordance with the invention, this technique provides no saving in calculation time since calculations are done in parallel for points in all four quadrants. When doing CT in accordance with the invention, to process most quickly only the portion of the image field in which is located the image of the body part of particular interest, the patient should be placed so that the body part of interest is near the axis of rotation for the fan beam source and opposing detector strip. Back-projection calculations are then performed for only that portion of the image field located within a window having its center at the origin corresponding to the location of the axis of rotation. This window is rectangular if the image memory is arranged with Cartesian addressed storage locations, or is circular if the image memory is arranged with polar-addressed storage locations. Locating the window defining the reduced-size image field in this way allows the parallel processing to provide its full advantage over serial processing, so one simultaneously gains the benefits of reductions in processing time owing to a reduced-size image field being calculated and owing to parallel rather than serial processing being used.

One skilled in the art and acquainted with the foregoing disclosure will be made able to discern other embodiments of the invention, and this should be borne in mind when construing the scope of the claims which follow.

WHAT IS CLAIMED IS;

1. A method for computing, in parallel, density functions for m image picture elements in accordance with the fan-beam back-projection reconstruction algorithm for computed tomography, for use before an image memory for storing said density functions and for use after a tomographic scanner having a fan beam energy source and opposing arcuate strip of detectors both exhibiting relative rotation in equal angular increments during a succession of scanning views, V in number, around a point of origin, said method comprising the steps of:

storing the detector responses of each of the successive scanning views after pre-convolution processing and convolution with a filter kernel;

selecting said m image picture elements to describe points in scanned space being equidistant from said point of origin and having integral coordinates inasfar as addressing said image memory during its writing where density functions is concerned;

successively calculating weights for correcting for fan beam divergence, which each weight is associated in common with each of said m selected image picture elements in a respective one of the V views thereof, the order of said calculating establishing scanning paths through the stored detector responses for accumulating density functions for each of said m selected image picture elements wherein the angle between the ray sum passing through each of those selected image elements and the central ray of the fan beam during their respective views is the same in all m cases;

determining by interpolation from the stored detector responses after pre-convolution processing and convolution with a filter kernel the density functions of each of said m selected elements, progressing over their respective scanning paths through the stored detector responses and calculating their like-valued interpolation coefficients in common; and accumulating the products of said weights with the density functions for each of m selected image picture elements progressing over their respective scanning paths through the stored detector responses.

2. A computer for use with a tomographic scanner having a fan beam energy source and opposing arcuate strip of detectors, exhibiting rotation in equal angular increments during a successive scanning of views V in number around a point of origin, said computer comprising:

a memory storing filtered responses of each of said detectors for each of said views, said memory having m portions respectively storing m bands of successive views, m being a positive plural integer;

a set of m processing elements, each of which m processing elements has associated therewith a respective said portion of said memory and accumulates a respective density function from the successive products of weighting functions supplied them in common and detector responses drawn from its said portion of memory in accordance with an index of ray sum angle;

a sidelines processor for generating said weighting function and said index for all of the m processing elements in said set thereof over a range included within a $(1/m)^{th}$ segment of a circle; and means for passing accumulated density function from each of said m processing elements to a successive one of said m processing elements after accumulating over each $(1/m)^{th}$ segment, said passing being done m times for each parallel computation of m density functions.

3. A computer as set forth in claim 2 wherein said means for passing comprises:

a first ring bus connection of said m processing elements, for passing in a first direction.

4. A computer as set forth in claim 3 wherein m is an even positive integer and said means for passing comprises:

a second ring bus connection of said m processing elements, for passing in a second direction opposed to said first direction; and means for directing the passing of the accumulated density functions for one half of the m picture elements being computed in parallel in the first direction via said first ring bus connection and directing the passing of the accumulated density functions for the remaining half of those m picture elements in the second direction via said second ring bus connection.

5. A computer as set forth in claim 4 wherein m is eight and wherein the m accumulated density functions are accumulated for points in respective octants of image space, which points have integral Cartesian coordinates.

6. A computer as set forth in claim 5 in combination with a Cartesian-coordinate-addressed image memory written with said accumulated density functions.

7. A computer as set forth in claim 3 in combination with a polar-coordinate-addressed image memory written with said accumulated density functions.

8. A computer for use with a tomographic scanner having a fan beam energy source and opposing arcuate strip of detectors, exhibiting rotation in equal angular increments during a successive scanning of views V in number around a point of origin, said computer comprising:

a memory storing filtered responses of each of said detectors for each of said views, said memory having m portions respectively storing m bands of successive views, m being a positive plural integer;

a set of m processing elements, each of which m processing elements accumulates a respective density function from the successive products of weighting functions supplied them in common and detector responses respectively supplied thereto in accordance with an index of ray sum angle;

a sidelines processor for generating said weighting function and said index for all of the m processing elements in said set thereof over a range included within a $(1/m)^{th}$ segment of a circle; and a data multiplexer for successively connecting each successive one of the m bands of memory during reading therefrom to each of said m processing elements in a respective spatial phasing.

9. A method for computing, in parallel, density functions for m image picture elements in accordance with the fan-beam back-projection reconstruction algorithm for computed tomography, for use before an image memory for storing said density functions and for use after a tomographic scanner having a fan beam energy source and opposing arcuate strip of detectors both exhibiting relative rotation in equal angular increments during a succession of scanning views, V in number, around a point of origin, said method comprising the steps of:

storing the detector responses of each of the successive scanning views after pre-convolution processing and convolution with a filter kernel;

selecting said m image picture elements to describe points in scanned space being equidistant from said point of origin and having integral coordinates inasfar as addressing said image memory during its writing where density functions is concerned;

successively generating weights for correcting for fan beam divergence, which each weight is associated in common with each of said m selected image picture elements in a respective one of the V views thereof, the order of said generating establishing scanning paths through the stored detector responses for accumulating density functions for each of said m selected image picture elements wherein the angle between the ray sum passing through each of those selected image elements and the central ray of the fan beam during their respective views is the same in all m cases;

determining by interpolation from the stored detector responses after pre-convolution processing and convolution with a filter kernel the density functions of each of said m selected elements, progressing over their respective scanning paths through the stored detector responses and calculating their like-valued interpolation coefficients in common; and accumulating the products of said weights with the density functions for each of m selected image picture elements progressing over their respective scanning paths through the stored detector responses.

10. A computer for use with a tomographic scanner having a fan beam energy source and opposing arcuate strip of detectors, exhibiting rotation in equal angular increments during a successive scanning of views V in number around a point of origin, said computer comprising:

a memory storing filtered responses of each of said detectors for each of said views, said memory having m portions respectively storing m bands of successive views, m being a positive plural integer;

a set of m processing elements, each of which m processing elements has associated therewith a respective said portion of said memory and accumulates a respective density function from the successive products of weighting functions supplied them in common and detector responses drawn from its said portion of memory in accordance with an index of ray sum angle;

means for generating said index of ray sum angle for each of the m processing elements in said set thereof over a range included within a $(1/m)^{th}$ segment of a circle;

means for generating a respective value of said weighting function for each value of said index of ray sum angle for all of the m processing elements in said set thereof; and means for passing accumulated density function from each of said m processing elements to a successive one of said m processing elements after accumulating over each $(1/m)^{th}$ segment, said passing being done m times for each parallel computation of m density functions.

11. A computer as set forth in claim 10 wherein said means for passing comprises:

a first ring bus connection of said m processing elements, for passing in a first direction.

12. A computer as set forth in claim 11 wherein m is an even positive integer and said means for passing comprises:

a second ring bus connection of said m processing elements, for passing in a second direction opposed to said first direction; and means for directing the passing of the accumulated density functions for one half of the m picture elements being computed in parallel in the first direction via said first ring bus connection and directing the passing of the accumulated density functions for the remaining half of those m picture elements in the second direction via said second ring bus connection.

13. A computer as set forth in claim 11 wherein m is eight and wherein the m accumulated density functions are accumulated for points in respective octants of image space, which points have integral Cartesian coordinates.

14. A computer as set forth in claim 13 in combination with a Cartesian-coordinate-addressed image memory written with said accumulated density functions.

15. A computer as set forth in claim 11 in combination with a polar-coordinate-addressed image memory written with said accumulated density functions.

16. A computer for use with a tomographic scanner having a fan beam energy source and opposing arcuate strip of detectors, exhibiting rotation in equal angular increments during a successive scanning of views V in number around a point of origin, said computer comprising:

a memory storing filtered responses of each of said detectors for each of said views, said memory having m portions respectively storing m bands of successive views, m being a positive plural integer;

a set of m processing elements, each of which m processing elements accumulates a respective density function from the successive products of weighting functions supplied them in common and detector responses respectively supplied thereto in accordance with an index of ray sum angle;

means for generating said index of ray sum angle for each of the m processing elements in said set thereof over a range included within a $(1/m)^{th}$ segment of a circle;

means for generating a respective value of said weighting function for each value of said index of ray sum angle for all of the m processing elements in said set thereof; and a data multiplexer for successively connecting each successive one of the m bands of memory during reading therefrom to each of said m processing elements in a respective spatial phasing.

* * * * *